May 1, 1934.  G. F. MURPHY  1,957,223

GRID ELECTRODE

Filed Sept. 25, 1928

Inventor:
George F. Murphy,
by Charles E. Tulla
His Attorney.

Patented May 1, 1934

1,957,223

UNITED STATES PATENT OFFICE 1,957,223

GRID ELECTRODE

George F. Murphy, Schenectady, N. Y., assignor to General Electric Company, a corporation of New York Application September 25, 1928, Serial No. 308,293

2 Claims. (Cl. 250—27.5)

The present invention relates to electrodes and more particularly to grid electrodes for electron discharge devices.

Patent No. 1,432,411 granted October 17, 1922 to J. H. Payne, Jr. discloses a helical grid structure comprising a large number of turns of wire of relatively small diameter which are self supporting and which require no welded joints between the various elements for maintaining them in their proper spaced relation. The structure employs a number of small helices which serve to space the grid turns, the helices being locked in position by means of stay rods which extend longitudinally through each of the helices and force certain turns of the latter against the larger grid wires.

The present invention contemplates improvements over the type of grid disclosed in said patent in that the grid wires are more securely fixed at the proper spacing to the grid stays and in that economies are effected in grid material and also in the time necessary for manufacture. In brief, these ends are attained by providing coils of relatively heavy, self-supporting wire in place of the small helices of fine wire disclosed in the Payne patent, said coils being bent to such a shape, which broadly may be termed elliptical, so as to conform closely to a relatively large portion of the superficial surface of the mass of metal forming the junction at the places of contact between the stay wires and the grid helix. The extent of the portion of metal over which the coil bears is considerably greater than in the case of the Payne helices which are strictly circular in shape and which bear merely along a line contact; the coil which constitutes a feature of the present invention is in a position to firmly clamp and rigidly hold the junction between the stay wires and the gird helix. My invention also contemplates the use of a single turn of the elliptical coil between adjacent turns of the grid helix, thus precluding springiness between said turns and thereby reducing the mass of metal about each stay wire.

Figure 1:
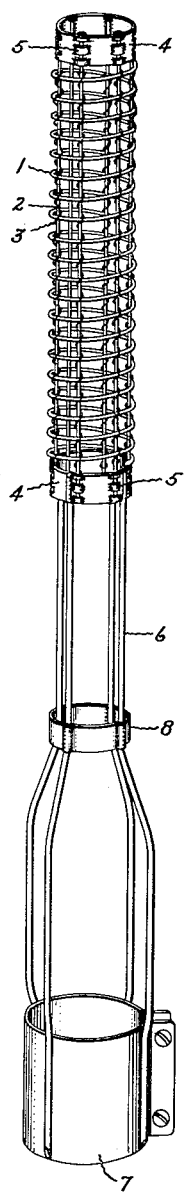
Figure 2:
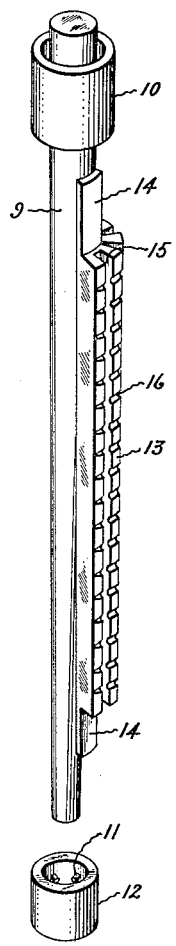
Figure 5:
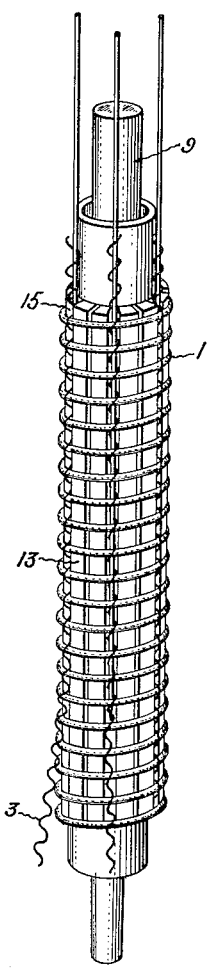
Figure 7:
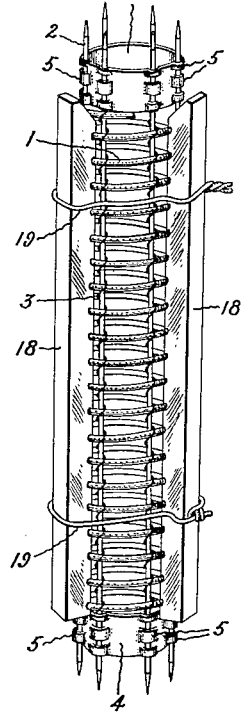
Figure 3:
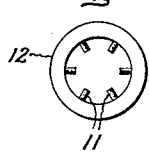
Figure 4:
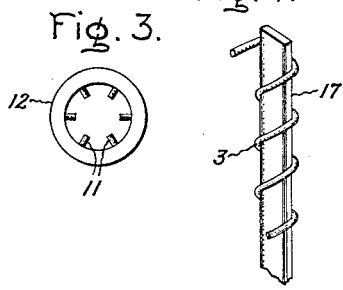
Figure 6:
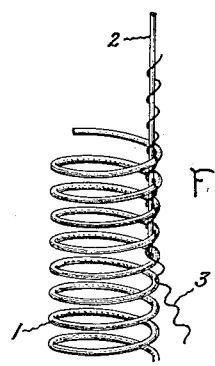

The objects of my invention are to provide a novel form of grid which is of simple construction; to provide a rigid attachment between the grid wires and stays without the use of welded joints; to employ in the manufacture of the grid the minimum amount of material and labor; to provide a grid structure having improved operating characteristics and long operating life. Other objects and features will be apparent as the specification is perused in connection with the accompanying drawing in which similar reference characters designate corresponding elements through the several views. As an example of another feature, the present invention contemplates the use of a collapsible mandrel on which the grid may be quickly and uniformly fabricated. Fig. 1 shows in perspective, a view of the improved grid; Fig. 2 illustrates a portion of the mandrel employed in the manufacture of the grid; Fig. 3 is a plan in detail of the lower part of the mandrel; Fig. 4 shows a blank upon which the binding coils conveniently may be formed; Fig. 5 is an assembly view of the complete mandrel and a partially complete grid assembled on the mandrel; Fig. 6 is a perspective view showing the spatial relation between the component parts of the grid structure; Fig. 7 is a view, in perspective, of the combined grid and spacer members preparatory to firing.

The grid structure shown in Fig. 1, as made in accordance with the present invention, comprises a helical member 1 of refractory metal such as tungsten, wound in the manner to be described, upon longitudinally-extending stay wires 2, also preferably of tungsten and secured thereto in proper spaced relation by means of several coils of wire 3 arranged parallel to the stay wires. The coils tightly embrace the helix and stay wires at each place of contact so that there is positively no relative movement between these members. The grid proper is terminated at each end by a ring member 4 which may be made of molybdenum, ears 5 being formed on each ring member having apertures through which the stay wires may be threaded. The grid may be supported from the stem of the tube by means of four equidistantly spaced rods 6 which are affixed to the lower ring, preferably by welding; the other ends of these rods are secured to an ordinary form of clamp 7 provided with screw-bolts for tightly embracing the stem of a tube in the well-known manner. Intermediate the lower ring 4 and the clamp 7, there is positioned a ring member 8 which fits about the rods 6 in the manner shown to lend rigidity to these rods and to maintain the spacing thereof. The grid proper is formed preferably on a collapsible mandrel, shown more clearly in Figs. 2 and 3. The mandrel is made up of a tapered, centrally disposed rod 9, the end with the larger diameter fitting into a collar 10 having suitable bore and the end of smaller diameter fitting within the space formed by a plurality of equidistantly spaced pins 11 which extend radially from the interior surface of a collar 12 as seen more clearly in Fig. 3. About the tapered rod, there are a plurality of segmental members or sectors (six as illustrated) of a number corresponding to the number of spaces between the pins 11 on the collar 12. These segments are provided at each end with extensions 14, 14 and are hollowed out along the inner surface to conform to the periphery of the rod 9; the outer surfaces of the extensions fit snugly within the respective collars. Each segment contains a longitudinally-extending, rectangularly-shaped slot 15, the purpose of which will be set forth hereinafter and also a series of transverse grooves 16 which form when the mandrel is complete, a continuous thread of the proper pitch for the grid helix 1.

The mandrel is assembled by first inserting the small end of the rod between the pins 11 of the lower collar 12. The segments are then placed around the rod in the manner shown, the lower extension 14 fitting snugly within the annular space between the rod and the interior surface of collar 12, also between each pair of adjacent pins 11—11. The upper collar is then placed in position to embrace the outer diameter of the upper extensions 14 which when assembled present a cylindrical surface. The mandrel is rendered tight and rigid by tapping the rod 9 at the larger end which serves more securely to clamp and wedge the members 14 against the restraining collars 10 and 12.

After the mandrel has been assembled, the grid helix 1, which has been fabricated elsewhere, is then positioned in the threads 16 formed in the sectors 13; this may be conveniently accomplished by rotating the mandrel and holding the helix stationary until the first thread catches with the first turn of the helix after which rotation of either the mandrel or the helix will serve to completely thread the latter about the mandrel. The next step is that of forming the binding coil, which may be wound on a bar or rod 17, substantially rectangular in cross-section, as shown more clearly in Fig. 4, the bar preferably being rotated between centers and the wire applied by a carriage which moves the length of the bar, screw-thread fashion to maintain proper tension and to give a uniform pitch to the wire. It is evident that the shape and dimensions of the bar 17, also the gage and pitch of the wire member 3 are dependent upon many factors, including the gage of the grid and stay wires, also the pitch of the grid, and must be determined experimentally for each size of grid. In making the determinations, it is to be borne in mind that the shape of the recurring loops and their distance apart must be such that the wire snugly embraces and securely binds the stay-wires to the helical grid at the places of contact. It is obvious that the shape of each loop cannot be circular because, in height, the loop must embrace the stay-wire and grid helix along the combined diameters whereas in width the loop need extend over only one of the grid turns, making for a rectangularly-shaped loop having height substantially twice as great as width. However, on account of limitations of pliability in the wire, these loops take on a shape which may be characterized as a series of bends and straight portions and in general, elliptical, as seen from the end. In forming a looped wire such as described, I have obtained satisfactory results in connection with a grid of .0515 gage tungsten, wound in helical form with approximately four turns to the inch and approximately 1" outside diameter attached to tungsten stay wires also of .0515 gage, by winding the wire 3 on a bar made from .1" round stock and ground flat on two opposite sides to a thickness of .05". The bar thus had a cross-section bounded in one direction by parallel sides and in a direction normal thereto by curved surfaces which constituted the original periphery of the round stock. The pitch of the wire along the bar obviously corresponds to that of the grid helix and sufficient tension must be applied to conform the wire as far as possible to the surface of the bar. The next step in the manufacture of the grid is to insert a looped member 3 or coil along each of the slots 15, if necessary, tamping or pressing the loops over the grid wires. The stay wires are then introduced one at a time from one end of the mandrel, these wires serving as a wedge between the lower loop portion of the coils 3 and the under surface of each grid turn at the place of contact, as indicated more clearly in Figs. 5 and 6. When the coil member has been properly designed including the shape and distance apart of the loops, a slight pressure exerted longitudinally of the stay wires is necessary to force same into position at which time the various members are rigidly locked into the proper spatial relation. It is evident that the transverse threads on the mandrel preclude any relative movement between the turns of the grid during this operation. Moreover, the longitudinal slots in the mandrel positively position the looped members and stay wires so that strict uniformity of grid construction is assured. The stay wires may then be cut so that there is a sufficient length extending beyond each end of the mandrel to accommodate the ring shaped members 4, 4 after which the wires are pointed in the manner shown in Fig. 7, to facilitate threading through the apertures in the ears 5 of said members. The surplus material may also be removed from the looped members 3, the ends being secured to the stay wires in any suitable manner, for example, by twisting or otherwise securing a full turn about each stay wire. In practice, it may be desirable to provide at the outset, stay wires of the proper length and suitably pointed to obviate the step of cutting and pointing these wires at this time. After rings 5, 5 have been affixed on the stay wires, the projecting ends of the latter are nipped off leaving just enough material from which to form a weld at the outer edges of the rings. While on the mandrel, spacers 18 are placed equidistantly about the grid to retain the various members in their proper positions and to prevent distortion in shape during the firing process described hereinafter. These spacers may take the form of bars of rectangular cross-section and of suitable length, having a series of transverse grooves which match the grid turns and serve to maintain the spatial relation between the said turns when the mandrel is disassembled. As shown in Fig. 7, three such spacers are usually sufficient, the spacers being arranged about the grid, intermediate several pairs of stay-wires, by means of straps 19 formed of twisted lengths of wire. The next step is to remove the mandrel from the grid and this is readily done by tapping the tapered rod 9 at the smaller end, withdrawing same, to allow sectors 13 and collars 10 and 12 to disengage. The next step in the fabrication of the grid proper is the firing process in which the grid and spacer members combined are subjected to a temperature, for example, 1250° C., preferably in a hydrogen furnace, sufficient to denude the metal of occluded gases and to remove stresses and strains within the various wire members. It should be noted that up to this time, there is allowed a certain amount of elongation of the grid under the heated conditons because the joints are not rigidly fixed in a manner such that welded joints would produce. The spacer members serve to prevent any serious distortions of the wire framework under these conditions. Upon cooling the structure, the welds between the stay wires and both rings may be made, preferably in a hydrogen atmosphere, with the spacers in place, the welds serving to rigidly fix the rings in their proper linear positions along the stay wires. The spacer members may then be removed by untwisting the wire bands 19. The ends of the grid helix may be secured to the respective ring members by means of metallic tabs (not shown) which embrace the rings, and have extensions to which the ends of the grid helix may be welded or otherwise attached. The final steps are those of affixing the support rods 6 to the lower ring member 5 by arc welding and the treatment of the grid in a sand blast to reduce the possibility of secondary emission from the various surfaces.

A grid made in the manner described is characterized by a number of features, among which are: lack of resiliency or relative movement between the various turns notwithstanding the total absence of welds at the places of contact between the various grid turns and stay wires; simplicity of manufacture; a high degree of reproducibility and utilization of the minimum amount of material which is advantageous from several standpoints including that of less cost, particularly in view of the expensiveness of tungsten, also that of facilitating the denudation of the material of the gas held in occlusion, also from the standpoint of providing substantial uniformity of material at successive points about the periphery of the grid which imparts to the latter a good operating characteristic. The rigidity of the various turns is derived from the peculiar formation of the binding coils which are constructed to tightly grip the large helix and the stay wires over a large surface, positively precluding the slightest movement therebetween. It will be evident that in departing from a circular or true helix, the shape of the loops is such that the stress exerted thereon is mostly in the nature of a longitudinal pull rather than torsional and hence, advantage is taken of the greater resisting power offered by the metal to longitudinal strain. This type of grid also lends itself readily to construction on a mandrel which facilitates manufacture and uniformity of reproduction.

No claims are made in this application on the collapsible mandrel or on the spacer members 18 disclosed herein but claims covering these features are contained in my divisional application Serial No. 694,277 filed October 19, 1933 and entitled "Apparatus for manufacturing wound grid electrodes."

What I claim as new and desire to secure by Letters Patent of the United States, is:

1. An electrode structure comprising a grid helix, a plurality of longitudinally-extending support wires of circular cross-section equidistantly spaced about the said helix and means for rigidly maintaining the position of said wires with respect to the helix, said means comprising members formed of a plurality of elliptically shaped and integral recurrent sections to form loops which produce a pinching contact along a relatively large portion of the junction between the grid helix and the support wires at the places of contact therebetween.

2. An electrode structure comprising a grid helix, a plurality of smaller helices having the same pitch as the grid helix, each of the turns of the smaller helices being intertwined with the respective turns of the grid helix and rods of circular cross-section respectively extending longitudinally through each of the smaller helices, said smaller helices being spaced about the grid helix and comprising elliptically shaped recurrent sections which fit closely about the junction between the grid helix and each circular rod whereby a rigid binding effect is secured between the helices and the rod.

GEORGE F. MURPHY.